United States Patent [19]

Newland

[11] 4,123,093
[45] Oct. 31, 1978

[54] DUCTBOARD COLLAR
[75] Inventor: William M. Newland, Littleton, Colo.
[73] Assignee: Hercules Supply Company, Denver, Colo.
[21] Appl. No.: 847,001
[22] Filed: Oct. 31, 1977
[51] Int. Cl.² ............................................. F16L 41/00
[52] U.S. Cl. .................................... 285/189; 285/319; 285/424
[58] Field of Search ....... 285/189, 424, 319, DIG. 22, 285/162, 196

[56] References Cited
U.S. PATENT DOCUMENTS

| | | | |
|---|---|---|---|
| 502,269 | 8/1893 | Baldwin | 285/319 X |
| 2,799,518 | 7/1957 | Anderson et al. | 285/424 X |
| 3,006,981 | 10/1961 | Weber | 285/424 X |
| 3,168,382 | 2/1965 | Chambers et al. | 285/319 X |
| 3,290,066 | 12/1966 | Primich et al. | 285/424 X |
| 3,406,988 | 10/1968 | Jones | 285/196 X |
| 3,596,936 | 8/1971 | Dieckmann | 285/149 |
| 3,871,688 | 3/1975 | Molino | 285/424 X |
| 3,954,289 | 5/1976 | Martin, Sr. | 285/424 X |
| 4,032,178 | 6/1977 | Neuroth | 285/DIG. 22 X |

*Primary Examiner*—Thomas F. Callaghan
*Attorney, Agent, or Firm*—Richard D. Law

[57] ABSTRACT

A fitting for connecting conduits to ductboard and other walls, including a short length of pipe having a seating bead and attached spring clips for securing the fitting to a bore in a ductboard, with the spring clips holding the ductboard against the bead.

1 Claim, 5 Drawing Figures

DUCTBOARD COLLAR

This invention relates to conduit fittings and specifically, to connecting collars for conduits to generally planar ductboard or other types of wall members.

PRIOR ART

Air systems for heating and cooling usually include a plenum having chamber walls to which may be connected lateral conduits, large headers having enclosing walls, etc., particularly where the header is of a relatively large cross-sectional area and of generally rectangular configuration. Smaller lateral conduits are connected to a header duct, or to the plenum to provide air flow to various locations in the building. It is highly advantageous to provide easily attached or removable conduit fittings to the larger chambers.

Among the connecting members shown in the prior art is a device in Greenlaw U.S. Pat. No. 3,010,738. This connector means utilizes a hook lip on the lower half of the conduit fitting which seats on the ductboard wall opening, and a pivoted arcuate wall engaging member bears against the inside of the duct board on the upper part of the bore.

Another duct fitting for connecting a circular duct to an arcuate wall is described in U.S. Pat. No. 3,596,936 to Dieckman, wherein a circular extension fits in a bore in the arcuate ductboard. The fitting extension is of a length equal to the thickness of the ductboard. A radial flange (shaped to the surface of duct) from the circular extension seats against the exterior of the ductboard, and removable "U" shaped spring clips hold the fitting to the ductboard.

A connecting attaching means is shown in U.S. Pat. No. 3,512,809 to Marhanka. This patent describes a fitting for sealing a conduit to a bowl shaped hairdrier. The fitting is arranged for a rectangular duct and includes a bowl seating flange which is held to the bowl by a thumb screw contained clip.

THE PRESENT INVENTION

The present invention, in a simple form, is a connecting fitting for a circular conduit to a planar ductboard, however, changes in shape permit the unit to be adapted to rectangular conduits, or to arcuate ductboard. In a circular form, the collar is a short length of pipe, usually sheet metal, which is crimped on its outer end for attaching to a circular conduit. On the opposite end, which is arranged for entrance into a slightly smaller diameter bore in the ductboard, and an exterior, radial bead which seats against the outside of the ductboard. Internally attached, generally opposed spring clips, with radial offsets are arranged to seat against the inside of the ductboard holding the ductboard against the bead thereby securing the fitting in the ductboard.

OBJECTS AND ADVANTAGES OF THE INVENTION

Included among the objects and advantages of the present invention is to provide a simple, highly effective connector for conduits to ductboard.

Another object of the invention is to provide a positively held attaching means between a conduit and ductboard which may be easily attached or detached from the ductboard.

Yet another object of the invention is to provide a connector for a conduit to a ductboard which is simply telescoped into a bore in the ductboard into a connecting position and is automatically locked into place in the bore in the ductboard.

Still another object of the invention is to provide a conduit connecting fitting arranged for preparation of different sizes and of different shapes.

An additional object of the invention is to provide a ductboard collar which is arranged with a seating and sealing bead on the exterior of the collar for contact with the ductboard around a bore, and spring attaching means secured in the collar presses the ductboard against the sealing bead.

These and other objects and advantages of the invention may be readily ascertained by referring to the following description and appended illustrations in which.

Figure 1:
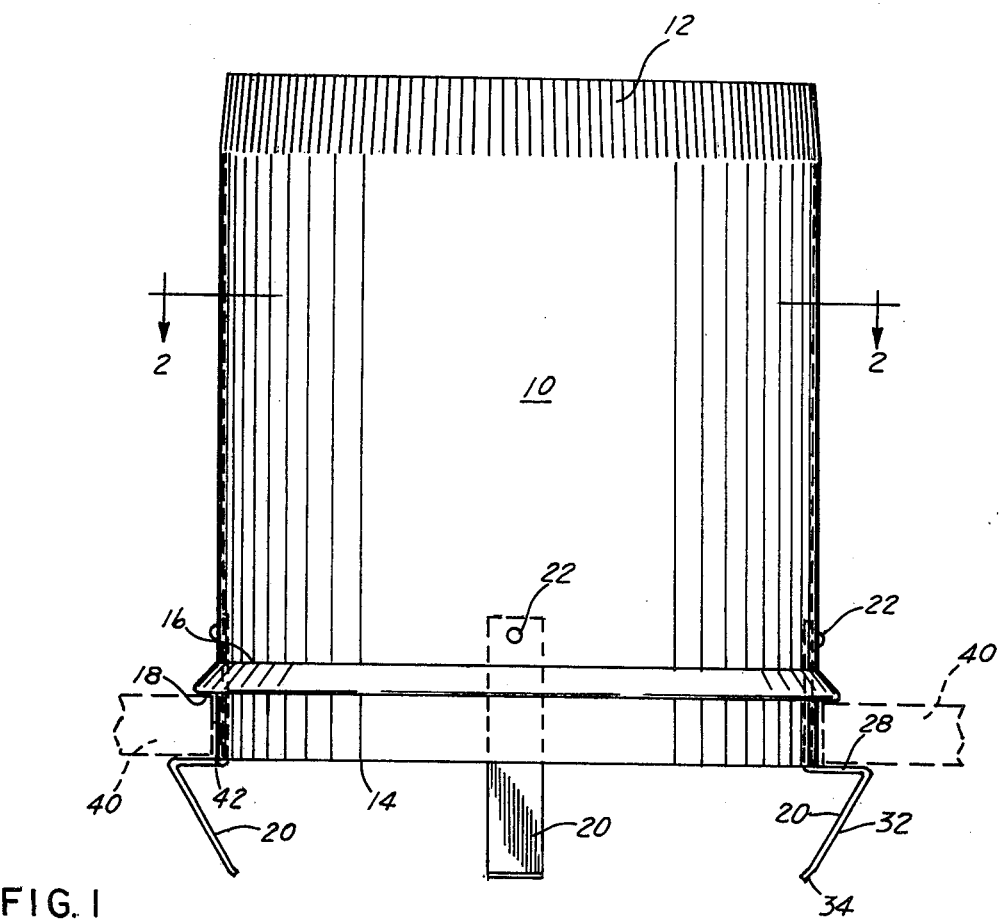
FIG. 1 is a side elevational view of a circular collar according to the invention providing a connecting fitting to ductboard for a circular duct.
Figure 2:
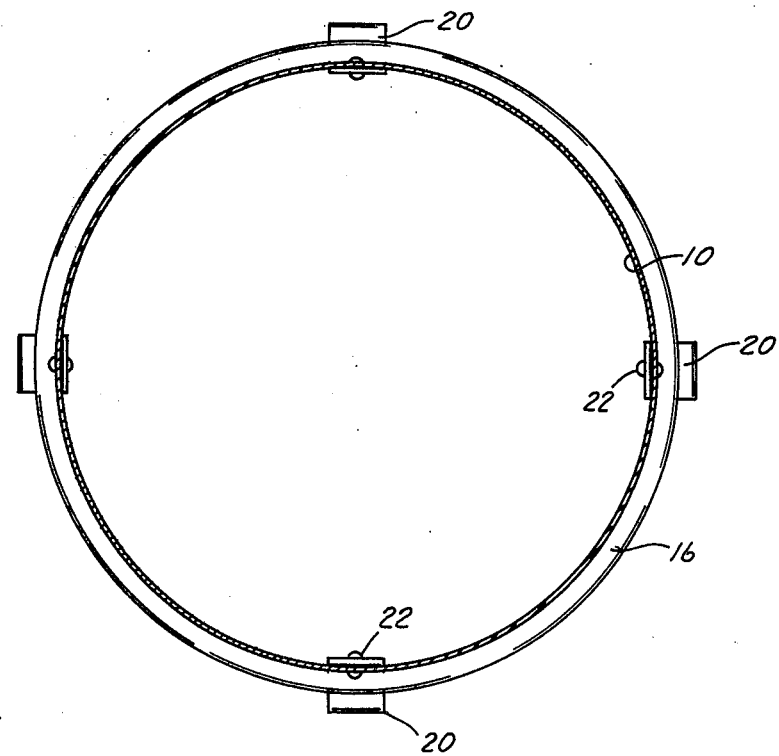
FIG. 2 is a top plan view of the device of FIG. 1 taken along section line 2—2.
Figure 3:
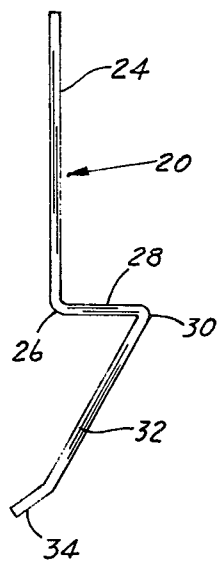
FIG. 3 is an enlarged detail view of a spring arrangement according to the invention for holding a ductboard collar into a ductboard.

In the device shown in FIGS. 1-3, one form of a collar according to the invention includes the circular, short length of sheet metal pipe 10 which has a crimped end 12 (for connection to another pipe) and full open end 14. Adjacent to but spaced from the end 14 is a radial bead 16. The bead 16 should extend radially from the collar, and in one form may be formed by rolling the bead out of the sheet metal itself, or it may be a bead attached, as for example, a rubber or other material bead secured to the exterior of the sheet metal. The bead should include a surface 18 which is arranged to seat against a duct wall and this surface should be spaced from the end 14 at a distance which is the approximate thickness of the ductboard. A plurality of spring clips 20 are spacedly secured to the inside of the collar by means of rivets 22. The spacing should provide general opposition to hold the collar uniformly around its circumference. The typical spring clip is shown in FIG. 3, where a piece of spring metal is broken or bent at several points to provide a clip usable for the collar. This includes a straight portion 24 which rests against the inside surface of the collar and is secured by means of the rivets 22 to the collar. The spring metal is broken at 26 in a 90° angle providing a radially extending portion 28, a break at 30 provides an inwardly directed portion 32 to a bent in end 34. Spring clips for collars in excess of 4 inches in diameter may be provided with a section 24 approximately 2 inches long and the extending radial section 28 approximately ⅜ of an inch, and the inwardly directed portion 32 approximately an inch and a half. About ¼ of the end is bent in at more of an angle than the portion 32.

In using the collar of the invention, a bore is formed through a ductboard, and as shown in FIG. 1 a ductboard 40 has a bore 42 formed therethrough. In the size indicated above for the spring clamp, the collar is adapted for attachment to a 1 inch fiberglass ductboard. By placing a short length of pipe in the position of the bore 42 and by scribing the ductboard from the inside, a hole or bore 42 may be formed slightly smaller in diameter than the exterior diameter of the pipe 10. This provides a tight, generally force-fit for the collar in the ductboard. Once the bore is formed, the collar is moved into position and is forced into the bore. The spring clip ends 34 are extended inwardly enough so that they fit inside the bore, and as the collar is pushed the springs are bent inwardly, permitting the springs to pass through the bore in the wall. When the surface 18 of the collar 16 seats on the exterior surface of the ductboard, the springs which are biased outwardly, cause the radial section 28 to seat against the interior surface of the ductboard providing a firm lock for the collar in the ductboard. The bead and the size of the bore in the ductboard provide an adequate seal for the collar to the ductboard.

Figure 4:
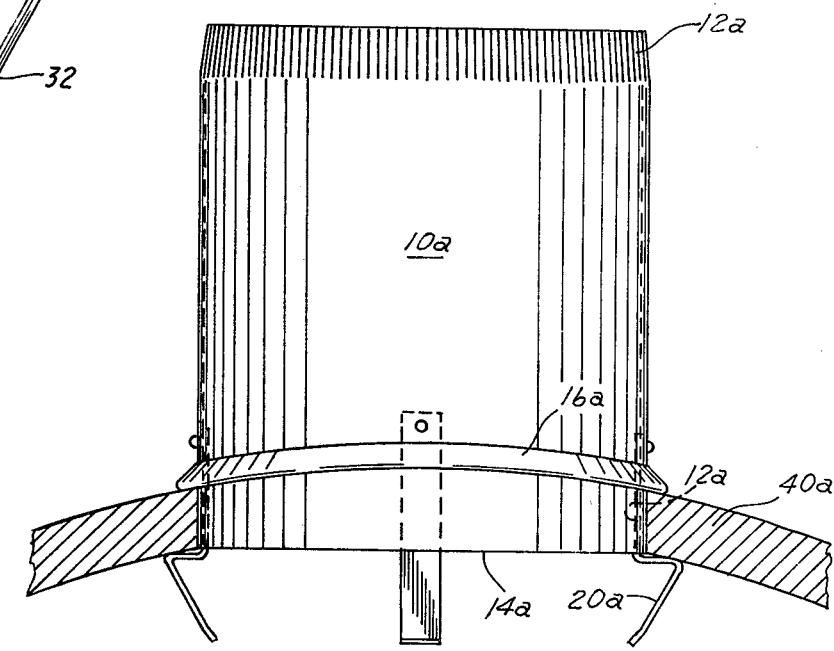
FIG. 4 is a cross-sectional view, partly in section, of a modified collar according to the invention arranged for attachment for a circular conduit to an arcuate ductboard.

As shown in FIG. 4 a modified connector is provided, in which a circular collar 10a is provided with a crimped outer end 12a for attachment to a circular duct, as is common practice. The internal end 14a is provided with a plurality of spring clamps 20a, in a manner similar to that described for FIG. 1. The bead 16a, however, is longitudinally arcuate to provide seating against an arcuate ductboard 40a around an orifice or bore 42a. The ductboard 40a is of an arcuate configuration (sometimes circular) and the collar 16a is formed to conform to the exterior surface portion around the bore in the ductboard. Such an arrangement provides adequate fitting and sealing of the collar to a ductboard having an arcuate configuration.

Figure 5:
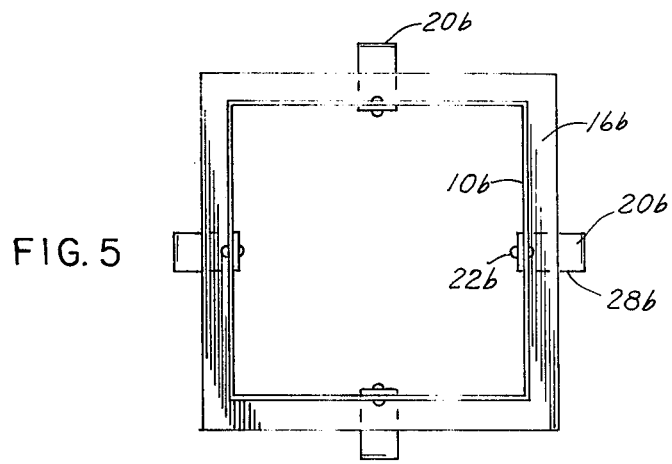
FIG. 5 is a top plan view of a rectangular configuration of a ductboard collar for attaching a rectangular duct to a ductboard.

As shown in FIG. 5, a rectangular shaped collar 10b, in this case a square collar, may be formed of sheet metal as is common practice for sheet metal work. A lateral bead 16b is provided on the surface of the rectangular collar adjacent the inner end, in a manner similar to that shown in FIG. 1. A plurality of clips 20b are internally secured in the sides of the duct by means of rivets 22b. The attachment of the rectangular collar of FIG. 5 is similar to that of the round collar FIG. 1. In this case, a rectangular opening is cut through a ductboard side and the collar 10b is pushed through the opening so that the bottom surface of the bead 16b seats against the outer surface of the ductboard, while the spring clips 20b are provided with their outwardly directed ledge 28b arranged to press against the inside of the ductboard securing the conduit into the ductboard.

The conduit may be sized and shaped to mate with the particular laterals to be connected to the headers. The bores through the ductboard are arranged to conform to the cross-sectional configuration of the collar. The bead is arranged to seat against the exterior of the ductboard at the bore, and the number and size of the spring clips are arranged to provide secure seating of the collar in the ductboard, depending on the size of the lateral collar.

What is claimed is:

1. A fitting for connecting conduits to larger ducts, comprising:
   (a) a short length of full diameter sheet metal conduit of the size and shape of the conduit to be connected to the duct, having means at one end for communicating assembly with a conduit, and having a full cross-section at the opposite end,
   (b) externally directed bead means circumferentially formed in said sheet metal extending outwardly from the exterior of said short length conduit adjacent to and spaced from said full cross-section end, and said bead including a complete circumferential bearing surface for the wall of a duct,
   (c) the length of the full cross-section end beyond said bead means being essentially a distance equal to the thickness of a wall of a duct, and
   (d) a plurality of three or more spring clips means mounted on said short length of conduit at the full cross-section end arranged in general opposition to provide holding of said fitting to duct and arranged to compress permitting entry of the full cross-section end through a bore in the wall of a duct and to expand after such entry to bear against the interior of the wall of the duct to bias said bearing surface against the exterior of the wall of the duct around the bore therethrough, said spring means each including a flat spring section secured to the inside of said short length of conduit and extending toward and beyond said full cross-section opening and a 90° portion extending outwardly from said opposite end in position to contact the inside of a duct board and hold said fitting in an opening in a duct board when expanded.

* * * * *